(12) United States Patent
Yamane

(10) Patent No.: US 12,300,441 B2
(45) Date of Patent: May 13, 2025

(54) MULTILAYER CERAMIC ELECTRONIC COMPONENT WITH GLASS GRAINS IN SIDE MARGIN

(71) Applicant: TAIYO YUDEN CO., LTD., Tokyo (JP)

(72) Inventor: Maiko Yamane, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 103 days.

(21) Appl. No.: 18/076,291

(22) Filed: Dec. 6, 2022

(65) Prior Publication Data

US 2023/0207219 A1 Jun. 29, 2023

(30) Foreign Application Priority Data

Dec. 24, 2021 (JP) ................. 2021-210664

(51) Int. Cl.
*H01G 4/30* (2006.01)
*C04B 35/468* (2006.01)
(Continued)

(52) U.S. Cl.
CPC .......... *H01G 4/30* (2013.01); *C04B 35/4682* (2013.01); *H01G 4/008* (2013.01); *H01G 4/012* (2013.01); *H01G 4/224* (2013.01); *H01G 4/12* (2013.01)

(58) Field of Classification Search
CPC .......... H01G 4/30; H01G 4/008; H01G 4/012; H01G 4/224; H01G 4/12; H01G 4/232; H01G 4/1227; H01G 4/002; C04B 35/4682; C04B 2235/3206; C04B 2235/3215; C04B 35/46; C04B 35/465; C04B 2235/36; C04B 2235/80; C04B 35/47; C04B 35/486; C04B 35/49; C04B 2235/3208; C04B 2235/6025; C04B 2235/785

See application file for complete search history.

(56) References Cited

U.S. PATENT DOCUMENTS

2012/0234462 A1  9/2012 Matsui et al.
2012/0250220 A1* 10/2012 Yamashita ............. H01G 4/005
                                                  361/321.2

(Continued)

FOREIGN PATENT DOCUMENTS

JP  2012-209539 A  10/2012

*Primary Examiner* — Nathan Milakovich
*Assistant Examiner* — Daniel M Dubuisson
(74) *Attorney, Agent, or Firm* — Pillsbury Winthrop Shaw Pittman, LLP

(57) ABSTRACT

A ceramic electronic component includes a multilayer body in which internal electrodes are stacked in a first axis direction, the multilayer body having side faces perpendicular to a second axis direction that is orthogonal to the first axis direction, ends of the internal electrodes being positioned at the side faces and aligned within a range of 0.5 μm in the second axis direction; and side margin portions covering the side faces, respectively, the side margin portions including a ceramic polycrystal as a main component and glass grains dispersed in the polycrystal, a total volume ratio of the glass grains with respect to the polycrystal being 1% or more and 20% or less, a median diameter of the glass grains is 0.20 μm or more and less than 0.75 μm, and is 90% or more of a median diameter of crystal grains constituting the polycrystal.

5 Claims, 10 Drawing Sheets

(51) Int. Cl.
    *H01G 4/008*     (2006.01)
    *H01G 4/012*     (2006.01)
    *H01G 4/224*     (2006.01)
    *H01G 4/12*     (2006.01)

(56) References Cited

U.S. PATENT DOCUMENTS

| | | | | |
|---|---|---|---|---|
| 2017/0323727 | A1* | 11/2017 | Mukoyama | H01G 4/248 |
| 2018/0315549 | A1* | 11/2018 | Ueda | H01G 4/224 |
| 2019/0318872 | A1* | 10/2019 | Mizuno | H01G 4/012 |
| 2020/0075254 | A1* | 3/2020 | Park | H01G 4/224 |
| 2020/0168397 | A1* | 5/2020 | Ryoo | H01G 4/30 |
| 2020/0234879 | A1* | 7/2020 | Aida | H01G 4/30 |
| 2020/0357574 | A1* | 11/2020 | Tanaka | B32B 38/04 |
| 2020/0365328 | A1* | 11/2020 | Mizuno | H01G 4/224 |

* cited by examiner

MULTILAYER CERAMIC ELECTRONIC COMPONENT WITH GLASS GRAINS IN SIDE MARGIN

FIELD

A certain aspect of the present disclosure relates to a multilayer ceramic electronic component to which side margin portions are formed at a later stage of the manufacture.

BACKGROUND

A technique for forming side margin portions in a later stage in a manufacturing process of a multilayer ceramic capacitor is known (see Patent Document 1, for example). This technique is advantageous in reducing the size and increasing the capacity of the multilayer ceramic capacitor, since both side margin portions of the plurality of internal electrodes can be reliably covered with the thin side margins.

As an example, in the method for manufacturing a multilayer ceramic capacitor described in Patent Document 1, a stack sheet obtained by stacking ceramic sheets having internal electrodes printed thereon is cut to form a plurality of multilayer bodies having the cut surfaces on which the internal electrodes are exposed as side surfaces. Then, side margin portions are formed on both side surfaces of the multilayer body by punching the ceramic sheets on the side surfaces of the multilayer body.

PRIOR ART DOCUMENTS

Patent Document

[Patent Document 1] Japanese Patent Application Publication No. 2012-209539

SUMMARY OF THE INVENTION

However, in multilayer ceramic capacitors with thin side margin portions, cracks generated from the outer surface of the side margin portions tend to extend to the side surfaces of the multilayer body. As a result, in the multilayer ceramic capacitor, moisture is likely to enter the side surfaces of the multilayer body through cracks penetrating through the side margin portions, resulting in poor insulation.

In view of the circumstances as described above, an object of the present invention is to provide a multilayer ceramic electronic component in which the protective effect of the side margin portions is less likely to be impaired.

According to a first aspect of the embodiments, there is provided a ceramic electronic component including: a multilayer body in which a plurality of internal electrodes are stacked in a first axis direction, the multilayer body having a pair of side faces perpendicular to a second axis direction that is orthogonal to the first axis direction, ends of the plurality of internal electrodes in the second axis direction being positioned at the pair of side faces and aligned within a range of 0.5 µm in the second axis direction; and a pair of side margin portions covering the pair of side faces, respectively, the pair of side margin portions including a ceramic polycrystal as a main component and a plurality of glass grains dispersed in the polycrystal, a total volume ratio of the plurality of glass grains with respect to the polycrystal being 1% or more and 20% or less, wherein a median diameter of the plurality of glass grains is 0.20 µm or more and less than 0.75 µm, and is 90% or more of a median diameter of a plurality of crystal grains constituting the polycrystal.

In this structure, since glass grains having a size equal to or larger than the crystal grains forming the polycrystal are dispersed in the polycrystal in the side margin portion, extension of cracks generated in the side margin portion are likely to be blocked by the glass grains. As a result, large cracks are less likely to occur in the side margin portions. And the effect of protecting the side surfaces of the multilayer body is less likely to be impaired.

An average number of the glass grains in each of a plurality of partitioned regions of 1 µm$^2$ in a grid pattern on a cross section of the pair of side margin portions may be 1 or more and 2 or less.

A size of each of the pair of side margin portions in the second axis direction may be 20 µm or less. The polycrystal may have a perovskite structure including barium and titanium.

DETAILED DESCRIPTION

Figure 1:
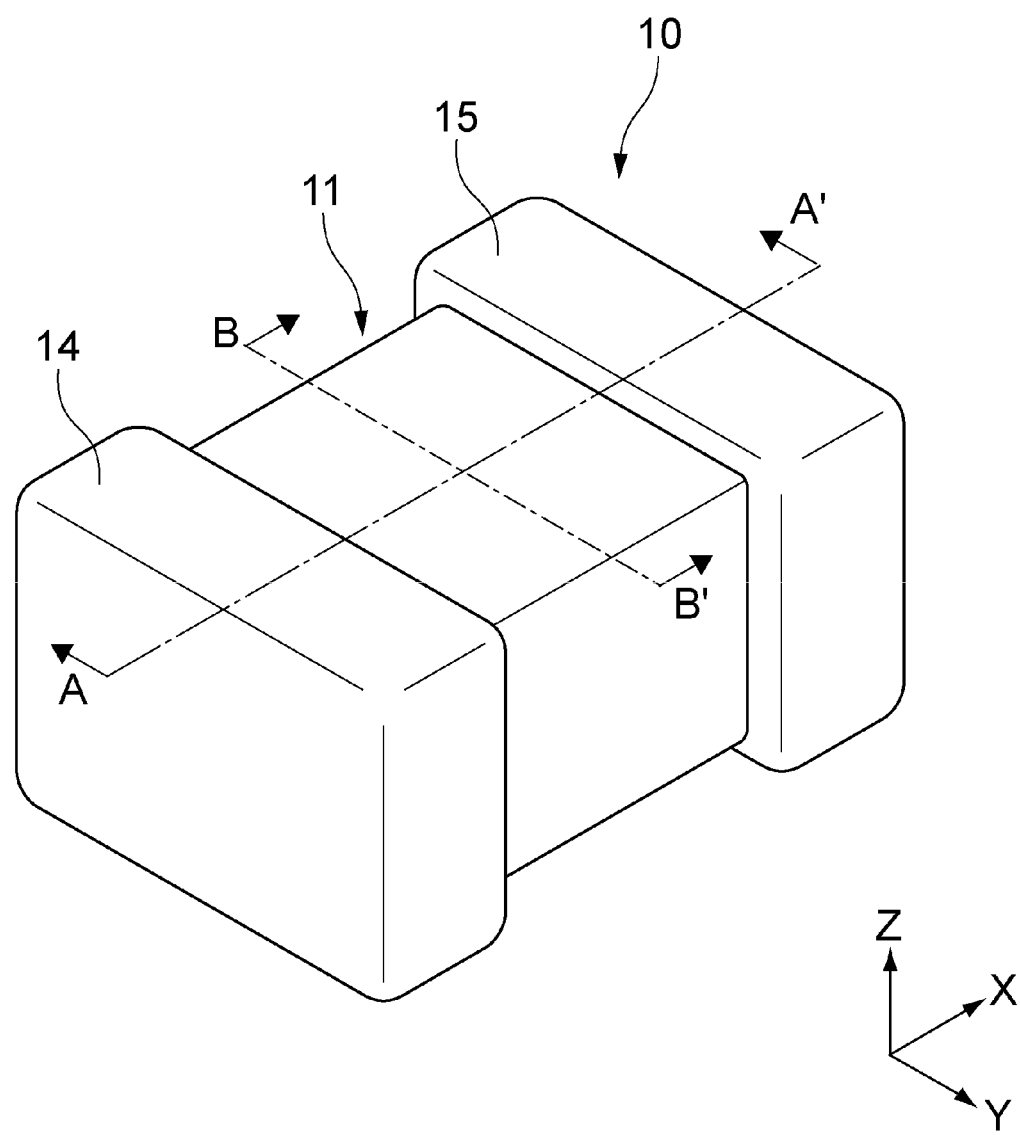
FIG. 1 is a partial cross-sectional perspective view of a multilayer ceramic capacitor.

A multilayer ceramic capacitor 10 according to an embodiment of the present invention will be described below with reference to the drawings. In the drawings, X-axis, Y-axis, and Z-axis that are orthogonal to each other are illustrated as appropriate. The X-axis, Y-axis, and Z-axis define a fixed coordinate system fixed with respect to the multilayer ceramic capacitor 10.

[Structure of the Multilayer Ceramic Capacitor 10]

Figure 2:
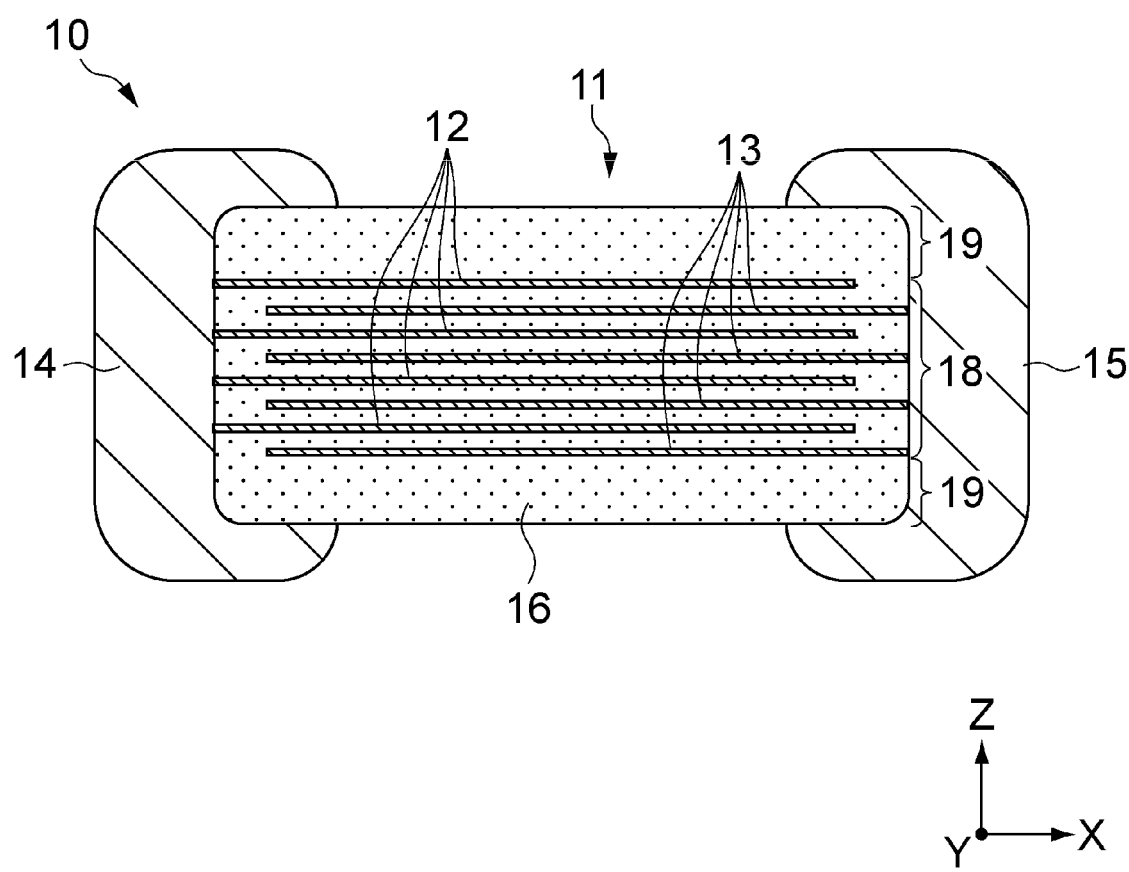
FIG. 2 is a cross-sectional view taken along line A-A' in FIG. 1.
Figure 3:
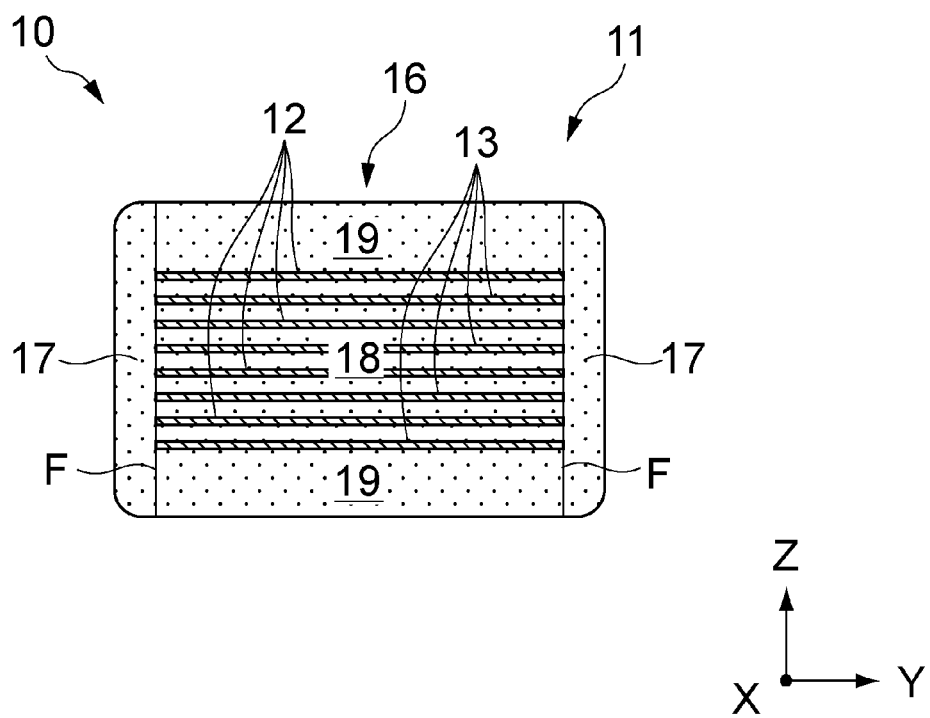
FIG. 3 is a cross-sectional view taken along line B-B' in FIG. 1.

FIG. 1 to FIG. 3 are diagrams illustrating the multilayer ceramic capacitor 10 according to one embodiment of the present invention. FIG. 1 is a perspective view of the multilayer ceramic capacitor 10. FIG. 2 is a cross-sectional view of the multilayer ceramic capacitor 10 taken along line A-A' in FIG. 1. FIG. 3 is a cross-sectional view of the multilayer ceramic capacitor 10 taken along line B-B' of FIG. 1.

The multilayer ceramic capacitor 10 includes a ceramic body 11, a first external electrode 14, and a second external electrode 15. The ceramic body 11 is configured as a hexahedron having a pair of end faces orthogonal to the X-axis, a pair of side surfaces orthogonal to the Y-axis, and a pair of main surfaces orthogonal to the Z-axis. The external electrodes 14 and 15 cover a pair of end faces of the ceramic body 11.

The pair of end surfaces, the pair of side surfaces, and the pair of main surfaces of the ceramic body 11 are all configured as flat surfaces. The flat surface according to the present embodiment does not have to be strictly a flat surface as long as it is recognized as flat when viewed as a whole. The flat surface also includes, for example, a surface having minute irregularities on the surface, a gently curved shape existing in a predetermined range, and the like.

The external electrodes 14 and 15 face each other in the X-axis direction with the ceramic body 11 interposed therebetween. The external electrodes 14 and 15 respectively extend from each end surface of the ceramic body 11 to the main surfaces and side surfaces. As a result, the external electrodes 14 and 15 have a U-shaped cross section parallel to the XZ plane and a U-shaped cross section parallel to the XY plane.

The shape of the external electrodes 14 and 15 is not limited to that illustrated in FIG. 1. For example, the external electrodes 14 and 15 may extend from both end surfaces of the ceramic body 11 to only one main surface and have an L-shaped cross section parallel to the XZ plane. Also, the external electrodes 14 and 15 do not have to extend to any of the main surfaces and side surfaces.

The external electrodes 14 and 15 are made of a good electrical conductor. Good electrical conductors forming the external electrodes 14 and 15 is a metal or an alloy including, for example, copper (Cu), nickel (Ni), tin (Sn), palladium (Pd), platinum (Pt), silver (Ag), and gold (Au) and the like as a main component. In addition, in this embodiment, the main component means the component with the highest content ratio.

The ceramic body 11 has a multilayer body 16 and a pair of side margin portions 17. The multilayer body 16 constitutes a pair of main surfaces and a pair of end surfaces of the ceramic body 11, and has a pair of side surfaces F perpendicular to the Y-axis. The pair of side margin portions 17 respectively cover the pair of side faces F of the multilayer body 16 and form the pair of side faces of the ceramic body 11.

The multilayer body 16 has a structure in which a plurality of flat ceramic layers extending along the XY plane are stacked in the Z-axis direction. The multilayer body 16 has a capacity forming portion 18 and a pair of cover portions 19. The pair of cover portions 19 cover the capacity forming portion 18 from above and below in the Z-axis direction, and constitute the pair of main surfaces of the ceramic body 11.

The capacity forming portion 18 has a plurality of sheet-like first and second internal electrodes 12 and 13 arranged between the plurality of ceramic layers and extending along the XY plane. The internal electrodes 12 and 13 are alternately arranged along the Z-axis direction. That is, in the capacity forming portion 18, the internal electrodes 12 and 13 face each other in the Z-axis direction with the ceramic layer interposed therebetween.

The first internal electrode 12 is drawn out to the end surface covered with the first external electrode 14. On the other hand, the second internal electrode 13 is drawn out to the end surface covered with the second external electrode 15. Thereby, the first internal electrode 12 is connected only to the first external electrode 14 and the second internal electrode 13 is connected only to the second external electrode 15.

The internal electrodes 12 and 13 are formed over the entire width of the capacity forming portion 18 in the Y-axis direction, and both ends in the Y-axis direction are located on both side surfaces F of the multilayer body 16. Thus, in the ceramic body 11, the positions of the Y-axis direction ends of the plurality of internal electrodes 12 and 13 are aligned on both side surfaces F of the multilayer body 16 within a range of 0.5 μm in the Y-axis direction.

The internal electrodes 12 and 13 are made of a good electrical conductor. Nickel (Ni) is typically used as a good electrical conductor forming the internal electrodes 12 and 13. In addition, a metal or an alloy including copper (Cu), palladium (Pd), platinum (Pt), silver (Ag), gold (Au) or the like as a main component can be used.

With such a configuration, in the multilayer ceramic capacitor 10, when a voltage is applied between the first external electrode 14 and the second external electrode 15, the plurality of voltages between the first internal electrode 12 and the second internal electrode 13 are applied to the ceramic layers. As a result, in the multilayer ceramic capacitor 10, electric charges corresponding to the voltage between the first external electrode 14 and the second external electrode 15 are stored.

In the ceramic body 11 of the multilayer ceramic capacitor 10, the plurality of ceramic layers constituting the capacity forming portion 18, the pair of cover portions 19, and the pair of side margin portions 17 are all made mainly of polycrystalline dielectric ceramics. In the ceramic body 11, it is preferable that the ceramics forming any of the above parts have the same composition system.

In the ceramic body 11, dielectric ceramics with a high dielectric constant are used in order to increase the capacity of each ceramic layer of the capacity forming portion 18. Dielectric ceramics with a high dielectric constant include, for example, perovskite structure materials containing barium (Ba) and titanium (Ti), represented by barium titanate ($BaTiO_3$).

The ceramic layer may instead be made of strontium titanate ($SrTiO_3$), calcium titanate ($CaTiO_3$), magnesium titanate ($MgTiO_3$), calcium zirconate ($CaZrO_3$), calcium zirconate titanate ($Ca(Zr, Ti)O_3$), barium zirconate ($BaZrO_3$) or titanium oxide ($TiO_2$).

In addition, in the ceramic body 11, the side margin portions 17 contain a plurality of glass grains G. The glass grains G are mainly amorphous grains, and typically contain silicon (Si) as a main component. In addition, in the ceramic body 11, the multilayer body 16 may also contain a smaller amount of the glass grains G than the side margin portions 17.

Figure 4:
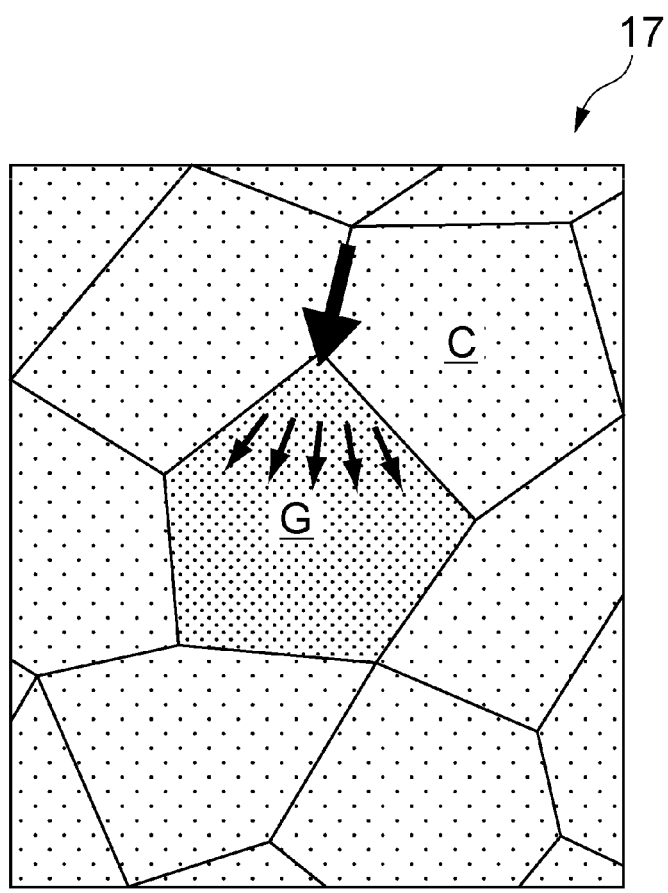
FIG. 4 is a partial cross-sectional view schematically illustrating a microstructure of a side margin portion.

FIG. 4 is a partial cross-sectional view schematically illustrating the microstructure of the side margin portion 17. As illustrated in FIG. 4, a plurality of crystal grains C constituting a polycrystal are illustrated in a low-density dot pattern, and glass grains G are illustrated in a high-density dot pattern. The side margin portion 17 has a characteristic microstructure in which the glass grains G are equal to or larger than the crystal grains C.

FIG. 4 illustrates a state in which a crack generated in the side margin portion 17 is about to extend in the direction indicated by the thick arrow. The glass grains G are present in the crack extension path illustrated in FIG. 4. Therefore, in the state illustrated in FIG. 4, the glass grains G are applied with energy that acts as a driving force for crack extension.

The highly viscous glass grains G have the effect of absorbing the energy applied from the cracks. In particular, since the side margin portions 17 have large glass grains G, the energy applied from the cracks can be sufficiently absorbed. Therefore, in the side margin portions 17, the cracks lose their propelling force in the glass grains G, and the cracks stop growing.

Figure 5:
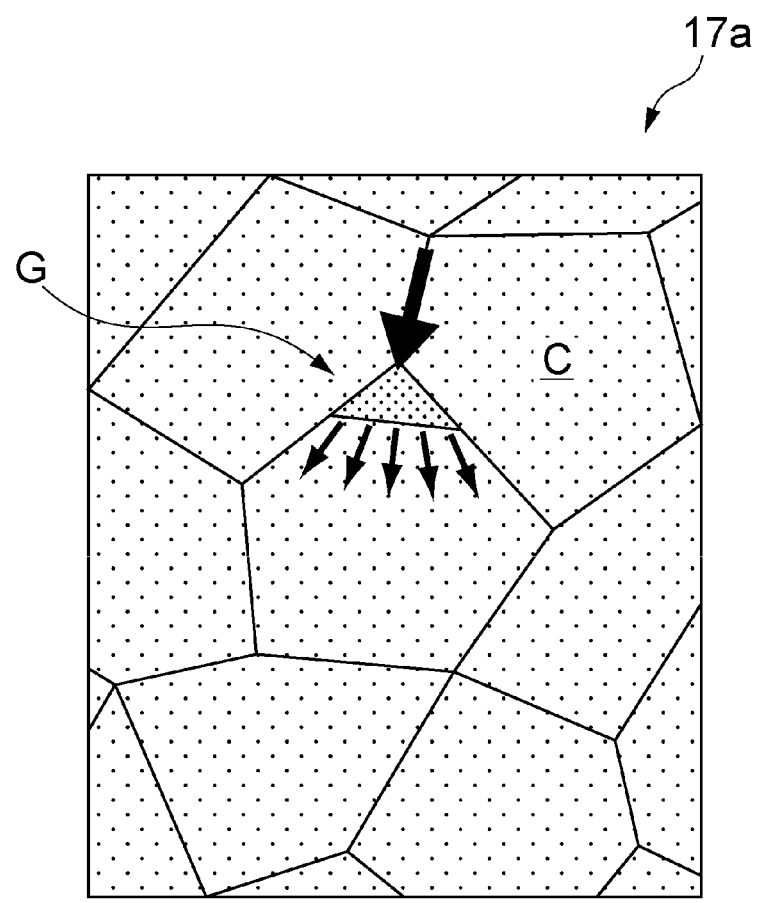
FIG. 5 is a partial cross-sectional view schematically illustrating a microstructure of a side margin portion according to a comparative example.

FIG. 5 is a partial cross-sectional view schematically illustrating the microstructure of a side margin portion 17*a* according to the comparative example of this embodiment. In the side margin portion 17*a*, unlike the side margin portion 17 according to the present embodiment, the glass grains G are significantly smaller than the crystal grains C, and the glass grains G are located at the grain boundaries or grain boundary triple points of the crystal grains C.

In the side margin portion 17*a*, the energy applied from the crack cannot be sufficiently absorbed by the small glass grains G, and the energy is applied via the glass grains G to the surrounding crystal grains C and crystal grain boundaries. Accordingly, in the side margin portion 17*a*, the crack does not stop at the glass grains G, and the crack tends to extend beyond the glass grains G.

Thus, in the side margin portion 17 according to the present embodiment, since the glass grains G have a size equal to or larger than that of the crystal grains C, unlike the side margin portion 17*a* according to the comparative example, the effect for stopping extension of cracks due to the glass grains G is effectively achieved. As a result, it is possible to suppress the occurrence of large cracks in the side margin portions 17.

In the side margin portion 17, the median diameter of the glass grains G may be 0.20 µm or more, and may be 90% or more of the median diameter of the crystal grains C constituting the polycrystal. Thereby, in the side margin portion 17, the action of absorbing the energy of the crack by the glass grains G can be sufficiently obtained.

The median diameter is defined as the median value of the grains diameters of grains existing within a predetermined field of view in the cross section, and can be obtained, for example, in a rectangular field of view of 30 µm×40 µm in the cross section of the side margin portion 17. The grains size of each grains can be obtained as a circle-equivalent diameter calculated as the diameter of a circle having the same area as the cross section of the grain.

In the side margin portion 17, when the glass grains G are too large, the flexibility becomes too high, which makes it difficult to maintain a normal shape during the manufacturing process, such as impairing the flatness of the outer surface. Therefore, it is preferable to keep the median diameter of the glass gains G at less than 0.75 µm in the side margin portions 17.

Furthermore, in the side margin portion 17 according to the present embodiment, a sufficient amount of the glass grains G are uniformly dispersed in the polycrystal, thereby greatly increasing the probability that the glass grains G exist in the crack extension path. Accordingly, the glass grains G can more reliably prevent the cracks generated in the side margin portion 17 from extension.

In particular, in the side margin portions 17, it is possible to prevent cracks generated from the outer surface from reaching the side surfaces F of the multilayer body 16 by penetrating in the Y-axis direction. As a result, in the multilayer ceramic capacitor 10, it is possible to prevent the occurrence of insulation failure due to moisture entering the side surface F of the multilayer body 16 through cracks in the side margin portions 17.

In the multilayer ceramic capacitor 10, cracks penetrating in the Y-axis direction are more likely to occur in the side margin portions 17 having smaller dimensions in the Y-axis direction. Therefore, in the multilayer ceramic capacitor 10, when the dimension of the side margin portion 17 in the Y-axis direction is 20 µm or less, the effect of preventing the occurrence of poor insulation can be obtained more effectively.

Specifically, in the side margin portion 17 according to the present embodiment, the ratio of the total volume of the portion where the glass grains G are present to the total volume of the portion where the polycrystal is present (total volume ratio) is 1% or more is required. Accordingly, in the side margin portion 17, it is possible to sufficiently increase the probability that the glass grains G are present in the propagation path of the crack.

The total volume ratio of the glass grains G to the polycrystal in the side margin portion 17 can be estimated from the grains size of the glass grains G existing within a predetermined field of view in the cross section of the side margin portion 17. For example, the total volume ratio can be determined in a photograph taken by SEM (Scanning Electron Microscope) of a rectangular field of 30 µm×40 µm in the cross section of the side margin portion 17.

Specifically, from the photograph of the cross section of the side margin portion 17, the diameter of each glass grain G having a maximum diameter of 0.05 µm or more is calculated as the circle equivalent diameter using the measured area of each glass grain G. The volume of each glass grain G corresponding to a sphere is calculated by using the calculated diameter. Thereby, the average volume of the glass grain G is obtained. Next, the number of glass grains G in the entire side margin portion 17 can be roughly calculated from the number of glass grains Gin a square region having an area of 1 µm$^2$. As a result, the total volume of the glass grains G is obtained by multiplying the average volume and the number of the glass grains G. The total volume ratio of the glass grains G can be obtained as a ratio of the total volume of the glass grains G to the polycrystalline volume obtained by subtracting the total volume of the glass grains G from the total volume of the side margin portion 17.

In the side margin portion 17, when the total volume ratio of the glass grains G to the polycrystalline body is too large, the flexibility becomes too high and the flatness of the outer surface is impaired during the manufacturing process, making it difficult to maintain a normal shape. For this reason, in the side margin portions 17, it is preferable to keep the ratio of the total volume of the glass grains G to 20% or less with respect to the polycrystal.

Figure 6:
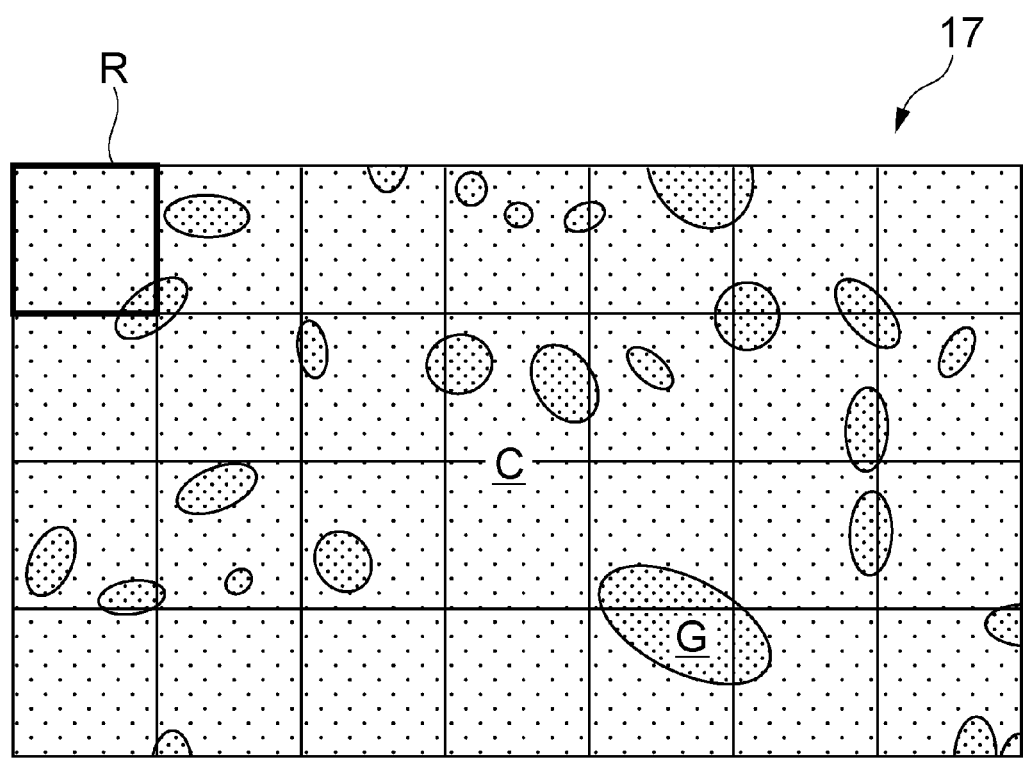
FIG. 6 is a cross section schematically illustrating distribution of glass grains in a side margin portion of a multilayer ceramic capacitor.
Figure 7:
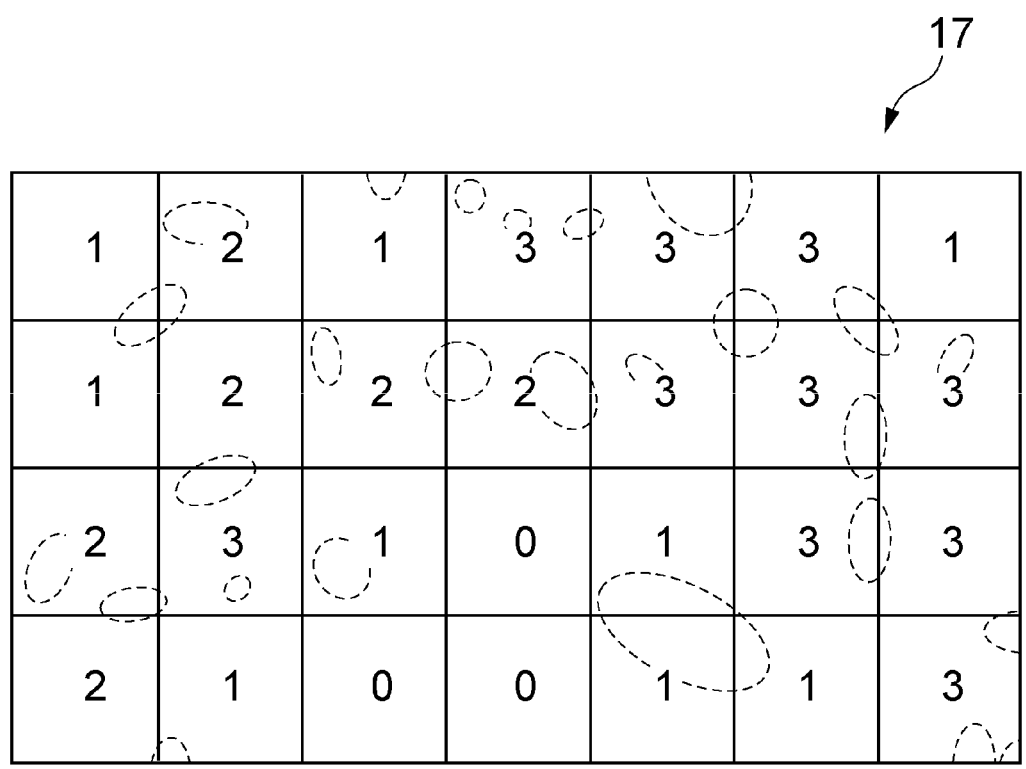
FIG. 7 is a cross section schematically illustrating distribution of glass grains in a side margin portion of a multilayer ceramic capacitor.

FIG. 6 and FIG. 7 are diagrams for explaining a method for evaluating the frequency with which the glass grains G exist in the side margin portion 17. FIG. 6 illustrates a plurality of square regions R partitioned in a grid pattern on the cross section of the side margin portion 17. The area of each region R is 1 µm$^2$. The plurality of regions R can be arranged, for example, in 4 rows and 7 columns.

FIG. 7 illustrates the number of glass grains G observed in each region R in the same field of view as in FIG. 6. In addition, in each region R, even when only a part of the glass grains G are observed, they are counted as one. In this embodiment, the frequency with which the glass grains G exist in the side margin portion 17 is evaluated by the average number of the glass grains G in the plurality of regions R.

Specifically, in the side margin portion 17 according to the present embodiment, the average number of the glass grains Gin all the arranged regions R is preferably 1 or more and 2 or less per 1 µm$^2$. Moreover, in the side margin portion 17, the standard deviation of the number of glass grains G per 1 µm$^2$ in all the arranged regions R is preferably 0.30 or less.

As a result, in the side margin portion 17, the glass grains G can be highly dispersed in the polycrystal composed of the crystal grains C, and the frequency at which the glass grains G are present becomes appropriate. Therefore, in the side margin portion 17, it is possible to sufficiently increase the probability that the glass grains G are present in the crack extension path while suppressing an increase in flexibility due to the glass grains G.

[Manufacturing Method of Multilayer Ceramic Capacitor 10]

Figure 8:
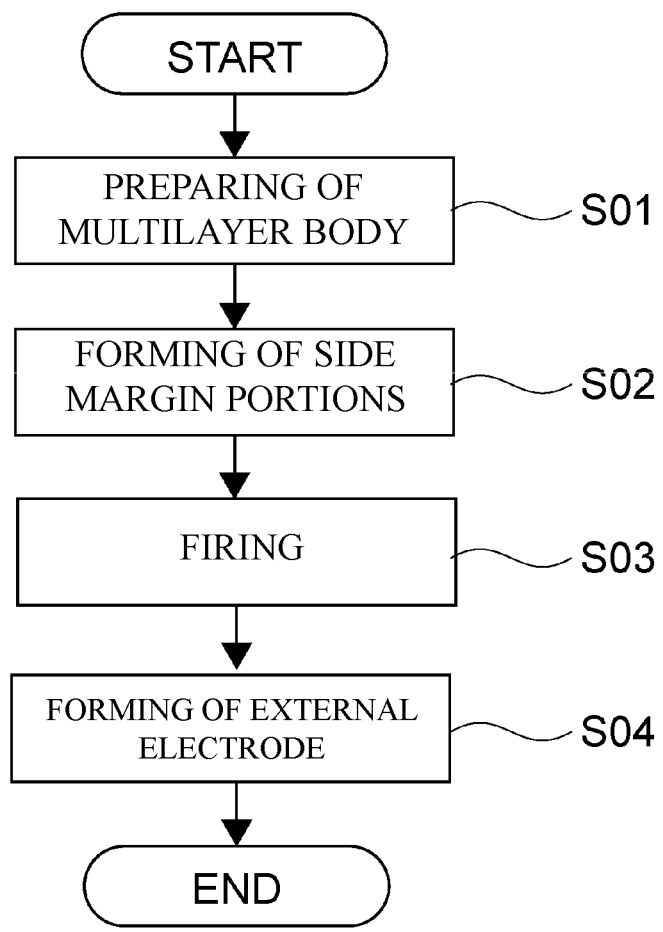
FIG. 8 is a flow chart illustrating a manufacturing method of a multilayer ceramic capacitor.
Figure 9:
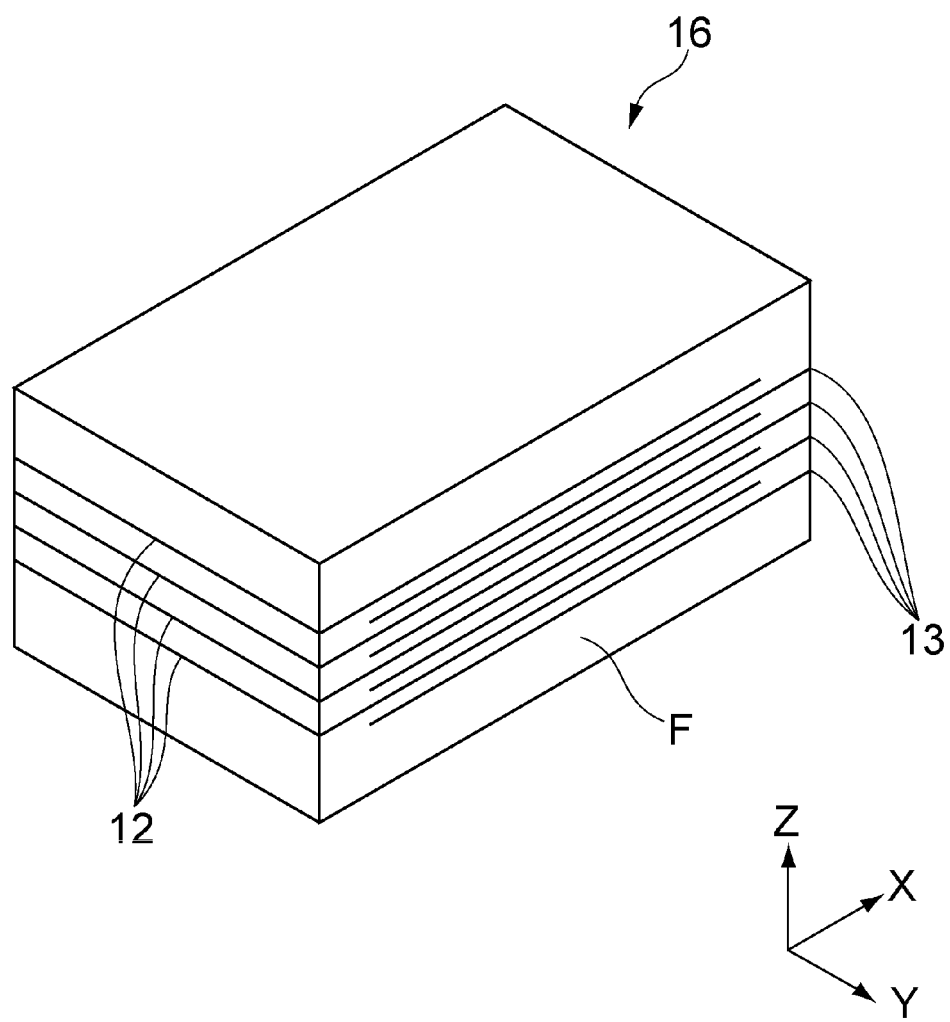
FIG. 9 illustrates a perspective view of an unfired multilayer body prepared in Step S01.
Figure 10:
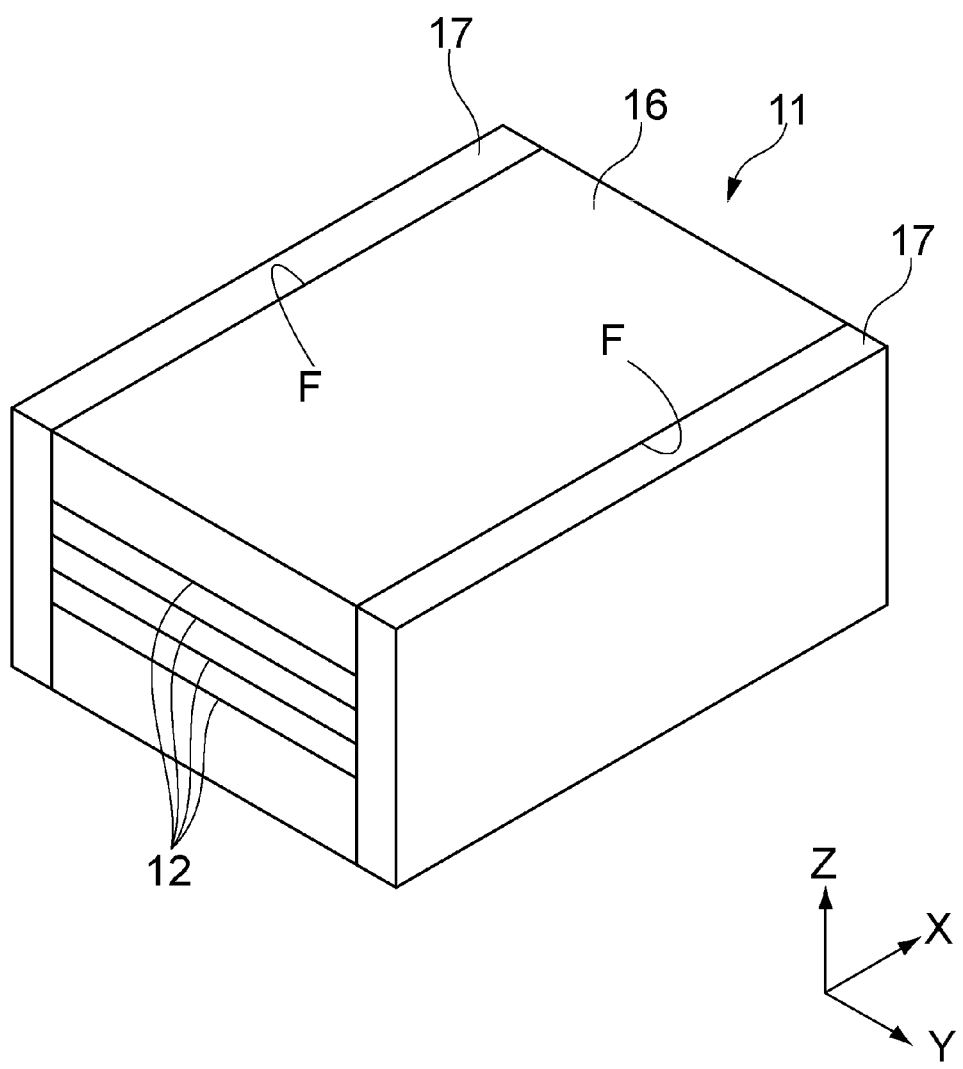
FIG. 10 illustrates a perspective view of an unfired ceramic body obtained in Step S02.

FIG. 8 is a flow chart illustrating the manufacturing method of the multilayer ceramic capacitor 10 according to this embodiment. FIG. 9 and FIG. 10 are diagrams illustrating the manufacturing process of the multilayer ceramic capacitor 10. Hereinafter, a method for manufacturing the multilayer ceramic capacitor 10 will be described along FIG. 8 and with appropriate reference to FIG. 9 and FIG. 10.

(Step S01: Preparing of the Multilayer Body)

In step S01, the unfired multilayer body 16 illustrated in FIG. 9 is prepared. The unfired multilayer body 16 can be produced using a stack sheet in which a plurality of large ceramic sheets are stacked in the Z-axis direction. A conductive paste for forming the internal electrodes 12 and 13 is patterned on the ceramic sheet corresponding to the capacity forming portion 18.

The unfired multilayer body 16 is obtained by cutting the stack sheet along the XZ plane and the YZ plane. For cutting the stack sheet, for example, a cutting device equipped with a press cutting blade or a rotating blade can be used. As a result, in the multilayer body 16, the pair of side faces F are obtained as cut surfaces where both ends of the internal electrodes 12 and 13 in the Y-axis direction are aligned.

(Step S02: Forming of Side Margin Portions)

In step S02, the pair of unfired side margin portions 17 are provided on the pair of side surfaces F of the unfired multilayer body 16 produced in step S01. As a result, as illustrated in FIG. 9, the unfired ceramic body 11 having the pair of side surfaces formed by the unfired side margin portions 17 is obtained.

A ceramic slurry mixed with an additive for forming the glass grains G can be used for the unfired side margin portions 17. Depending on the amount of additive added to the ceramic slurry, the total volume ratio of the glass grains G to the polycrystal in the side margin portion 17 after firing can be controlled.

For example, glass powder or glass frit can be used as additives added to the ceramic slurry. It is possible to adjust the grain size of the glass grains G in the side margin portion 17 after firing, depending on the particle size of the glass powder or glass frit used as an additive added to the ceramic slurry.

The side margin portion 17 can be formed by any method. The side margin portion 17 can be formed using, for example, a ceramic sheet obtained by forming a ceramic slurry into a sheet shape. In this case, for example, the ceramic sheet can be punched at the side face F of the multilayer body 16 or cut in advance and attached to the side face F of the multilayer body 16.

Further, in order to form the side margin portions 17, it is also possible to use an unformed ceramic slurry as it is instead of a ceramic sheet that has been formed into a sheet shape in advance. In this case, the ceramic slurry can be applied to the side surface F of the multilayer body 16 by, for example, causing the side surface F of the multilayer body 16 to be permeated by the slurry.

(Step S03: Firing)

In step S03, the ceramic body 11 obtained in step S02 is fired to produce the ceramic body 11 of the multilayer ceramic capacitor 10 illustrated in FIG. 1 to FIG. 3. In step S03, the grain size of the glass grains G and the dispersibility of the glass grains G in the side margin portions 17 after firing can be adjusted by, for example, the firing temperature.

For example, Table 1 shows the median diameter of the crystal grains C in the side margin portion 17 after firing, the median diameter of the glass grains G in the side margin portion 17 after firing, the ratio of the median diameter of the glass grains G to the median diameter of the crystal grains C, and the average number of glass grains G per 1 $\mu m^2$ in a plurality of regions R after firing.

TABLE 1

| FIRING TEMPERATURE (° C.) | MEDIAN DIAMETER ($\mu m$) | | RATIO OF MEDIAN DIAMETER | AVERAGE NUMBER OF GLASS GRAIN G |
|---|---|---|---|---|
| | CRYSTAL GRAIN C | GLASS GRAIN G | | |
| 1202 | 0.194 | 0.219 | 112.9% | 1.5 |
| 1222 | 0.210 | 0.236 | 112.4% | 1.6 |
| 1242 | 0.200 | 0.300 | 150.0% | 1.3 |

As shown in Table 1, by changing the firing temperature, it can be seen that it is possible to change the median diameter of the crystal grains C in the side margin portion 17 after firing, the median diameter of the glass grains Gin the side margin portion 17 after firing, the ratio of the median diameter of the glass grains G to the median diameter of the crystal grains C, and the average number of glass grains G per 1 $\mu m^2$ in the region R after firing.

(Step S04: Forming of External Electrode)

In step S04, the external electrodes 14 and 15 are formed on both ends of the ceramic body 11 fired in step S03 in the X-axis direction to fabricate the multilayer ceramic capacitor 10 illustrated in FIG. 1 to FIG. 3. A method for forming the external electrodes 14 and 15 in step S04 can be arbitrarily selected from known methods.

Thus, the multilayer ceramic capacitor 10 illustrated in FIG. 1 to FIG. 3 is completed. In this manufacturing method, since the side margin portions 17 are formed on the side faces F of the multilayer body 16 where the internal electrodes 12 and 13 are exposed, the positions of the ends in the Y-axis direction of the plurality of internal electrodes 12 and 13 in the ceramic body 11 are aligned within 0.5 µm in the Y-axis direction.

Examples and Comparative Examples

As examples and comparative examples of the above embodiment, samples of multilayer ceramic capacitors having different configurations of the side margin portions were produced. The sizes of the samples according to Examples 1 to 3 and Comparative Examples 1 to 5 were A0603 size of 0.6 mm in the X-axis direction, 0.3 mm in the Y-axis direction, and 0.3 mm in the Z-axis direction.

Regarding the side margin portions of the samples produced in Examples 1 to 3 and Comparative Examples 1 to 5, the median diameter of the crystal grains C, the median diameter of the glass grains G, the ratio of the median diameter of the glass grains G to the median diameter of the crystal grains C, the total volume ratio of the glass grains G to the polycrystal, and the average number of the glass grains G in a plurality of regions R were determined. Table 2 shows this result.

TABLE 2

| | MEDIAN DIAMETER (μm) | | RATIO OF MEDIAN DIAMETER | TOTAL VOLUME RATIO OF GLASS GRAIN G | AVERAGE NUMBER OF GLASS GRAIN G |
|---|---|---|---|---|---|
| | CRYSTAL GRAIN C | GLASS GRAIN G | | | |
| EXAMPLE 1 | 0.15 | 0.20 | 133% | 1.7% | 2.0 |
| EXAMPLE 2 | 0.15 | 0.50 | 333% | 7% | 1.0 |
| EXAMPLE 3 | 0.15 | 0.74 | 493% | 20% | 1.0 |
| COMPARATIVE EXAMPLE 1 | 0.15 | 0.10 | 67% | 0.1% | 1.6 |
| COMPARATIVE EXAMPLE 2 | 0.25 | 0.20 | 80% | 1.7% | 2.0 |
| COMPARATIVE EXAMPLE 3 | 0.15 | 0.20 | 133% | 0.1% | 0.4 |
| COMPARATIVE EXAMPLE 4 | 0.15 | 0.50 | 333% | 27% | 1.8 |
| COMPARATIVE EXAMPLE 5 | 0.15 | 0.75 | 500% | 22% | 1.0 |

Each of Examples 1 to 3 has the configuration of the above embodiment. On the other hand, in Comparative Examples 1 and 2, the ratio of the median diameter of the glass grains G to the median diameter of the crystal grains C is less than 90%. In Comparative Examples 1 and 3, the total volume ratio of the glass grains G to the polycrystal is less than 1%. Comparative Examples 4 and 5 differ from the above embodiment in that the total volume ratio of the glass grains G to the polycrystal exceeded 20%.

Appearance and insulation defect rate were evaluated for each of the samples according to Examples 1-3 and Comparative Examples 1-5. Regarding the appearance, the samples according to each example and comparative example were visually observed to see whether the shape of the side margin portion was normal. When the appearance of a sample was normal, the sample was evaluated as "A". When the appearance of a sample was not normal, the sample was evaluated as "B".

In the evaluation of the insulation defect rate, a moisture resistance test was conducted by holding 100 samples of each example and comparative example for 100 hours in an environment with a temperature of 85° C. and a humidity of 85%. For each example and comparative example, the ratio of samples with an insulation resistance of less than 1 MΩ after the moisture resistance test out of 100 samples was taken as the insulation defect rate. Table 3 shows these results.

TABLE 3

| | APPEARANCE | INSULATION DEFECT RATE |
|---|---|---|
| EXAMPLE 1 | A | 0% |
| EXAMPLE 2 | A | 0% |
| EXAMPLE 3 | A | 0% |
| COMPARATIVE EXAMPLE 1 | A | 100% |
| COMPARATIVE EXAMPLE 2 | A | 49% |
| COMPARATIVE EXAMPLE 3 | A | 75% |

TABLE 3-continued

| | APPEARANCE | INSULATION DEFECT RATE |
|---|---|---|
| COMPARATIVE EXAMPLE 4 | B | 0% |
| COMPARATIVE EXAMPLE 5 | B | 0% |

As shown in Table 3, all of the samples according to Examples 1 to 3 were evaluated for appearance as "A", and normal-shaped side margin portions were obtained. Further, in Examples 1 to 3, the insulation defect rate was 0%, that is, none of the samples had an insulation resistance of less than 1 MΩ after the moisture resistance test.

On the other hand, in all of Comparative Examples 1 to 3, many samples showed an insulation resistance of less than 1 MΩ after the moisture resistance test. It is thought that this was because, in Comparative Examples 1 to 3, the ratio of the median diameter of the glass grains G to the median diameter of the crystal grains C, and the total volume ratio of the glass grains G to the polycrystal were small, so that the effect of the glass grains G was not sufficiently obtained.

In addition, in both Comparative Examples 4 and 5, the appearance evaluation was "B", and the side margin portions of normal shape could not be obtained. It is thought that this was because the samples according to Comparative Examples 4 and 5, in which the total volume ratio of the glass grains G to the polycrystal exceeded 20%, were unable to maintain a normal shape due to the excessively high flexibility of the side margins.

Other Embodiments

Although the embodiments of the present invention have been described above, it goes without saying that the present invention is not limited to the above-described embodiments and can be modified in various ways.

For example, in the above embodiment, the multilayer ceramic capacitor 10 is explained as an example of the multilayer ceramic electronic component, but the present invention can be applied to multilayer ceramic electronic components in general. Examples of such multilayer ceramic electronic components include chip varistors, chip thermistors, and multilayer inductors.

What is claimed is:

1. A multilayer ceramic electronic component comprising:
a multilayer body in which a plurality of internal electrodes are stacked in a first axis direction, the multilayer body having a pair of side faces perpendicular to a second axis direction that is orthogonal to the first axis direction, ends of the plurality of internal electrodes in the second axis direction being positioned at the pair of side faces and aligned within a range of 0.5 μm in the second axis direction; and
a pair of side margin portions covering the pair of side faces, respectively, the pair of side margin portions including a ceramic polycrystal as a main component and a plurality of glass grains dispersed in the polycrystal, a total volume ratio of the plurality of glass grains with respect to the polycrystal being 1% or more and 20% or less, in the pair of side margin portions,
wherein a median diameter of the plurality of glass grains is 0.20 μm or more and less than 0.75 μm, and is 90% or more of a median diameter of a plurality of crystal grains constituting the polycrystal, and
wherein an average number of the glass grains in each of a plurality of partitioned regions of 1 μm$^2$ in a grid pattern on a cross section of the pair of side margin portions is 1 or more and 2 or less.

2. The multilayer ceramic electronic component as claimed in claim 1,
wherein a size of each of the pair of side margin portions in the second axis direction is 20 μm or less.

3. The multilayer ceramic electronic component as claimed in claim 1,
wherein the polycrystal has a perovskite structure including barium and titanium.

4. A multilayer ceramic electronic component comprising:
a multilayer body in which a plurality of internal electrodes are stacked in a first axis direction, the multilayer body having a pair of side faces perpendicular to a second axis direction that is orthogonal to the first axis direction, ends of the plurality of internal electrodes in the second axis direction being positioned at the pair of side faces and aligned within a range of 0.5 μm in the second axis direction; and
a pair of side margin portions covering the pair of side faces, respectively, the pair of side margin portions including a ceramic polycrystal as a main component and a plurality of glass grains dispersed in the polycrystal, a total volume ratio of the plurality of glass grains with respect to the polycrystal being 1% or more and 20% or less, in the pair of side margin portions,
wherein a median diameter of the plurality of glass grains is 0.20 μm or more and less than 0.75 μm, and is 90% or more of a median diameter of a plurality of crystal grains constituting the polycrystal,
wherein the multilayer body has a structure in which a plurality of ceramic layers are stacked in the first axis direction, and has a capacity forming portion and a pair of cover portions,
wherein in the capacity forming portion, the plurality of internal electrodes face each other in the first axis direction with the ceramic layer interposed therebetween, and
wherein the plurality of ceramic layers, the pair of cover portions, and the pair of side margin portions are all made mainly of polycrystalline dielectric ceramics, and said polycrystalline dielectric ceramics that form the plurality of ceramic layers, the pair of cover portions, and the pair of side margin portions have a same composition system.

5. The multilayer ceramic electronic component as claimed in claim 4,
wherein the multilayer body contains a smaller amount of the glass grains than the side margin portions.

* * * * *